Sept. 30, 1969 NOBUTOSHI KIHARA 3,470,315
SKIP FIELD RECORDING AND REPRODUCING SYSTEM
WITH MODIFIED VERTICAL SYNC SIGNAL
Filed Nov. 18, 1965 4 Sheets-Sheet 1

Inventor
Nobutoshi Kihara by Attys

Inventor
Nobutoshi Kihara by Attys

Sept. 30, 1969 NOBUTOSHI KIHARA 3,470,315

SKIP FIELD RECORDING AND REPRODUCING SYSTEM
WITH MODIFIED VERTICAL SYNC SIGNAL

Filed Nov. 18, 1965 4 Sheets-Sheet 3

Inventor
Nobutoshi Kihara by Attys

Inventor
Nobutoshi Kihara by Attys

United States Patent Office 3,470,315

Patented Sept. 30, 1969

3,470,315
SKIP FIELD RECORDING AND REPRODUCING SYSTEM WITH MODIFIED VERTICAL SYNC SIGNAL

Nobutoshi Kihara, Tokyo, Japan, assignor to Sony Corporation, Tokyo, Japan, a corporation of Japan Continuation-in-part of application Ser. No. 475,070, July 27, 1965. This application Nov. 18, 1965, Ser. No. 508,542

Int. Cl. H04n 5/76

U.S. Cl. 178—6.6 6 Claims

ABSTRACT OF THE DISCLOSURE

In a system for recording and reproducing video signals in which only specified fields of a continuous train of fields are recorded on magnetic tape and during reproduction each of the tracks corresponding to a field is reproduced a plurality of times, a vertical synchronizing pulse is combined with the reproduced signals during reproduction of regular motion pictures and said vertical synchronizing pulse is omitted during reproduction of a still picture signal.

This invention relates generally to a system for recording and reproducing signals, and more particularly to such a system with which it is desired to record or reproduce visual images on a magnetic tape and to be able to selectively produce a still picture.

This patent application is a continuation-in-part of patent application Ser. No. 475,070 filed in my name on July 27, 1965, and entitled "Recording and Reproducing System", now U.S. Patent 3,359,365, issued Dec. 19, 1967.

In systems presently being used to record and/or reproduce visual images on a magnetic tape the magnetic tape is generally limited in length and therefore an extended series of video signals cannot be recorded for a prolonged period of time without interruption. In order to overcome this difficulty there is described in my aforementioned U. S. Patent 3,359,365, a magnetic tape recording and reproducing system in which the amount of magnetic tape used per unit time can be reduced by one half. This is accomplished by recording on a recording medium such as magnetic tape, the video signals of only specified fields, such, for example, as the odd number fields of a continuous train of fields. During reproduction the video signals of each field are successfully reproduced twice to thereby obtain a series of signals which are equal in number to the original signals. With this arrangement each frame of the reproduced signal consists of the video signals of only the odd number fields of the original video signal but the picture quality is not appreciably deteriorated due to the fact that there is no appreciable difference in the information content of each frame of the original video signal, that is, there is substantially no variation or change in the information content of the video signals of the fields in the same frame.

It has been found with the foregoing system, however, that during reproduction, the reproduced video signals overlap in time so that when the two signals are applied together to a mixer circuit, beats are produced between the two signals thereby producing beat noise in the output signal. Since this beat noise is produced during the vertical synchronizing period the synchronization is affected to the point where it becomes out of step. Another disadvantage with the system described above is that difficulty is encountered in producing still pictures.

In view of the foregoing the primary object of the present invention is to provide an improved recording and reproducing system in which the amount of magnetic tape used during recording is reduced in proportion to the percentage of fields or frames recorded, and which includes means to prevent the synchronization from becoming out of step.

Another object of the present invention is to provide a recording and reproducing system for recording and reproducing video signals which system includes means for generating vertical synchronizing pulses.

A further object of the present invention is to provide a video tape recorder and reproducer which can produce both normal motion picture signals and still picture signals.

These and further objects, features and advantages of the present invention will appear from a reading of the following detailed description of one embodiment of the invention which is to be read in conjunction with the accompanying drawings wherein like components in the several views are identified by the same reference numeral.

Figure 1:
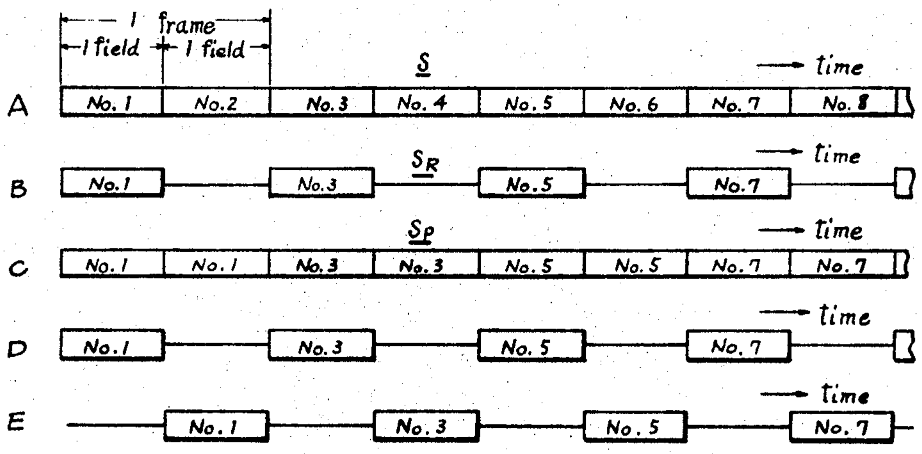
FIGURE 1 illustrates in block form various video signal arrangements that are present in the system of the present invention.
Figure 2:
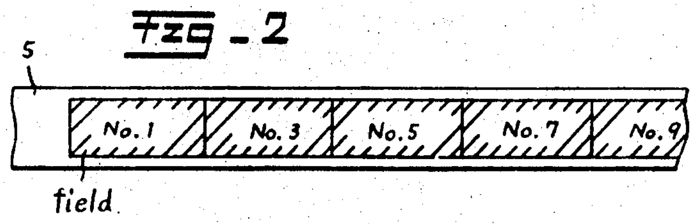
FIGURE 2 is a schematic diagram illustrating an arrangement of signals as recorded on magnetic tape by the system of the present invention.

Referring now to the drawings and particularly to FIGURE 1A there is illustrated in block form an interlaced original video signal arrangement in which the respective frames consist of odd number fields such as first, third, fifth, etc., and even number fields such as second, fourth, sixth, etc. In accordance with the present invention in order to record an original video signal S, such as illustrated in FIGURE 1A, the video signals of only, for example, the odd number fields, such as the first, third, fifth, etc., are sequentially recorded on a magnetic tape 5, the recorded signals being identified by the designation $S_R$ and being illustrated in FIGURE 1B. The signal as recorded on a magnetic tape 5 is illustrated in FIGURE 2, vertical synchronizing pulses being interposed between the video signals.

During reproduction each of the fields recorded on the magnetic tape 5 is reproduced twice in order to obtain a series of reproduced video signals $S_P$ as illustrated in FIGURE 1C, the reproduced video signals $S_P$ having the information content of only the odd number fields of the original video signals S.

Figure 3:
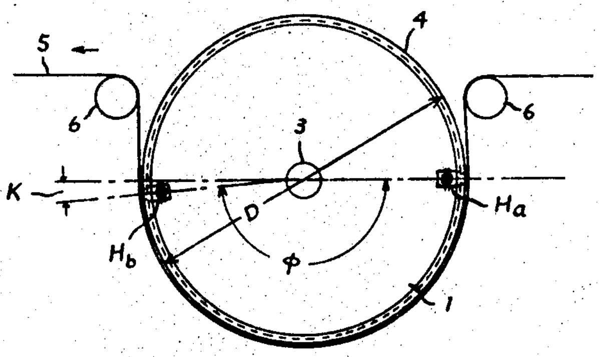
FIGURE 3 is a schematic plane view illustrating one embodiment of a rotary magnetic head assembly for use in the system of the present invention.
Figure 4:
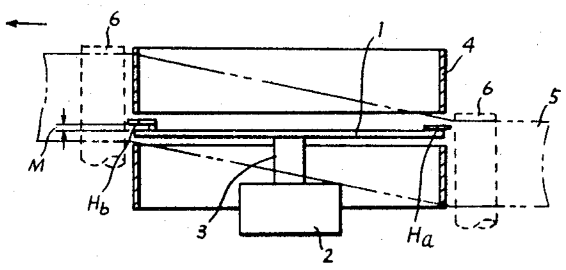
FIGURE 4 is a side view of the rotary magnetic head assembly illustrated in FIGURE 3.

As illustrated in FIGURES 3 and 4 a rotary disc 1 is mounted on a rotary shaft 3, the shaft 3 and consequently the disc 1 being rotated by a motor 2. The periphery of the disc 1 has attached thereto at spaced intervals magnetic heads $H_a$ and $H_b$. The heads $H_a$ and $H_b$ are spaced apart a predetermined angular distance $\varphi$ and a predetermined axial distance M as illustrated in FIGURES 3 and 4. In operation the magnetic tape 5 is directed around a cylindrical guide member 4 by means of guide rollers 6 which are positioned obliquely to the direction of travel of the tape 5. In the embodiment illustrated in FIGURE 3 and 4 the magnetic tape 5 travels around a 180 degree portion of the guide member 4 and during this travel around the guide member 4 the tape 5 is contacted by the magnetic heads $H_a$ and $H_b$.

Figure 5:
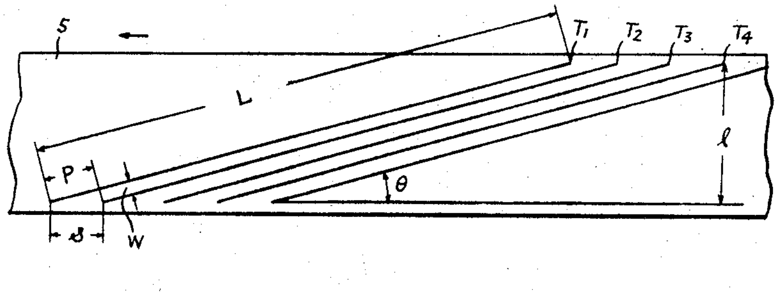
FIGURE 5 is a schematic diagram illustrating on an enlarged scale the magnetic tracks formed on a magnetic tape by the use of the rotary magnetic head assemblies illustrated in FIGURES 3 and 4.

With the apparatus illustrated in FIGURES 3 and 4 video signals consisting of one frame with two fields are recorded on the magnetic tape 5 by the magnetic head $H_a$, the recording being in the form of parallel skew magnetic tracks $T_1$, $T_2$, $T_3$, etc., as illustrated in FIGURE 5. The signals from only odd number fields are recorded on each of the tracks $T_1$, $T_2$, $T_3$, etc., by properly adjusting and selecting the following variables:

Q=revolutions per minute of the magnetic heads $H_a$ and $H_b$
$\varphi$=angular distance between the heads $H_a$ and $H_b$
D=diameter of tape guide 4
$l$=effective width of the tape 5
V=velocity of the tape 5

Since the rotary magnetic head $H_a$ contacts the magnetic tape 5 during each half cycle of revolution and the duration of this contact corresponds to that of approximately one field, the original video signals of fields such as the first, second, third, etc., as illustrated in FIGURE 1A are selectively recorded on the magnetic tape 5 in such a manner that only the odd number fields such as the first, third, fifth, etc., are recorded. This is illustrated in FIGURE 1B. The recorded signals form the magnetc tracks $T_1$, $T_2$, $T_3$, etc., such as illustrated in FIGURE 5.

It can therefore be seen that by properly selecting and adjusting the variables set forth above, it is possible to record only every other field. A comparison of FIGURES 1A and 1B illustrates that the odd number fields have been recorded while the even number fields have been eliminated. It is, of course, to be understood that the odd number fields can be iliminated while the even number fields are being recorded.

During reproduction the magnetic heads $H_a$ and $H_b$ scan the magnetic tracks $T_1$, $T_2$, $T_3$, etc., which have been recorded on the magnetic tape 5. The registration of the magnetic heads $H_a$ and $H_b$ with the magnetic tracks is accomplished by properly selecting the distance M between the heads $H_a$ and $H_b$. When the distance M as illustrated in FIGURE 4 is properly selected the heads $H_a$ during reproduction will scan the track $T_1$ to reproduce the video signal of the first field, and the other magnetic head $H_b$ will scan the same track $T_1$ to again reproduce the video signal of the first field. This results in the reproduction of a composite signal such as that illustrated in FIGURE 1C which consists of two first frames, two third frames, two fifth frames, etc. The signals reproduced by the heads $H_a$ and $H_b$ are illustrated respectively in FIGURES 1D and 1E. The two signals reproduced by the heads $H_a$ and $H_b$ and as illustrated in FIGURES 1D and 1E are combined to form a composite signal illustrated in FIGURE 1C.

It can accordingly be seen that with the apparatus illustrated in FIGURES 3 and 4 only alternate fields of the original video signal are recorded and the intermediate fields are eliminated. During reproduction the fields that have been recorded are reproduced twice in order to obtain a continuous video signal that is equal in duration to the original video signal. The design criteria for the rotary magnetic head assemblies illustrated in FIGURES 3 and 4 are as follows:

$$Q=F/n$$

$$\phi=\frac{360°}{n}\pm K°$$

$$M=W/n$$

$$K°=\frac{P}{n}\cdot\frac{360°}{\pi D}$$

$$W=P\tan\theta$$

In the foregoing equations F represents the frequency of the field to be recorded on each magnetic track, $n$ represents the number of magnetic heads, W represents the distance between adjacent tracks, P represents the distance between the starting points of adjacent tracks, and D represents the diameter of the tape guide 4. The variables K and M are the requirements that have to be met in order to have the magnetic heads scan the same magnetic tracks during both reproducing and recording. These variables are illustrated in FIGURES 3, 4 and 5. In a typical device the following parameters were used:

$n$=2
F=60 cycles per second
$\phi$=170 degrees
$K^0$=10 degrees
M=0.6 mm.
D=80 mm.

Figure 6:
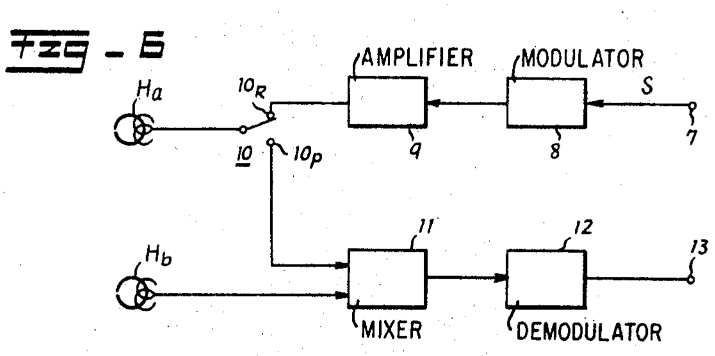
FIGURE 6 is a block diagram illustrating one embodiment of an electrical system for use with the rotary magnetic head assemblies illustrated in FIGURES 3 and 4.

A block diagram of the electrical circuit for the magnetic tape recording and reproducing system of the present invention is illustrated in FIGURE 6. During recording the video signals emanating from a video signal source 7 is applied to a frequency or phase modulator 8 in order to obtain the usual modulated signal. This modulated signal is applied to the magnetic head $H_a$ after first being amplified by the amplifier 9. During recording the contact 10R of the switch 10 is in the recording position indicated in FIGURE 6.

When it is desired to reproduce the recorded signal the reproduced output of the magnetic head $H_a$ is applied to the mixer circuit 11 by moving the contact 10R of the switch 10 to the reproducing position indicated by the numeral 10P. It is to be noted that a signal from the head $H_b$ is also applied to the mixer circuit 11. In this manner the outputs from the heads $H_a$ and $H_b$ are mixed by a mixer circuit 11 and both of these output signals are then applied to a demodulating circuit 12 from which the desired reproduced output signal is delivered to a terminal 13.

As is evident from the foregoing with the apparatus illustrated in FIGURES 3 and 4 the video signals are applied only to the magnetic head $H_a$ during recording and not to the magnetic head $H_b$. As a result of this the video signals of only every other field are recorded on the magnetic tape 5 by the magnetic head $H_a$ to form on a magnetic tape 5 the magnetic tracks $T_1$, $T_2$, $T_3$, etc., as illustrated in FIGURE 5. When it is desired to reproduce the signals recorded on the magnetic tape 5 the magnetic tracks $T_1$, $T_2$, $T_3$, etc., are each successively scanned twice, once by the magnetic head $H_a$ and once by the magnetic head $H_b$. Accordingly the video signals of only every other field are recorded and the amount of tape used is therefore reduced by one half.

During reproduction, however, the reproduced video signals emanating from the magnetic heads $H_a$ and $H_b$ overlap in time at the beginning and end points. Due to this fact when the two signals from the heads $H_a$ and $H_b$ are applied together to the mixer circuit 11, beats are produced between the two signals which results in beat noise in the output signals. Since this beat noise is produced during the vertical synchronizing period, the synchronization is affected to the point where it is out of step.

Figure 7:
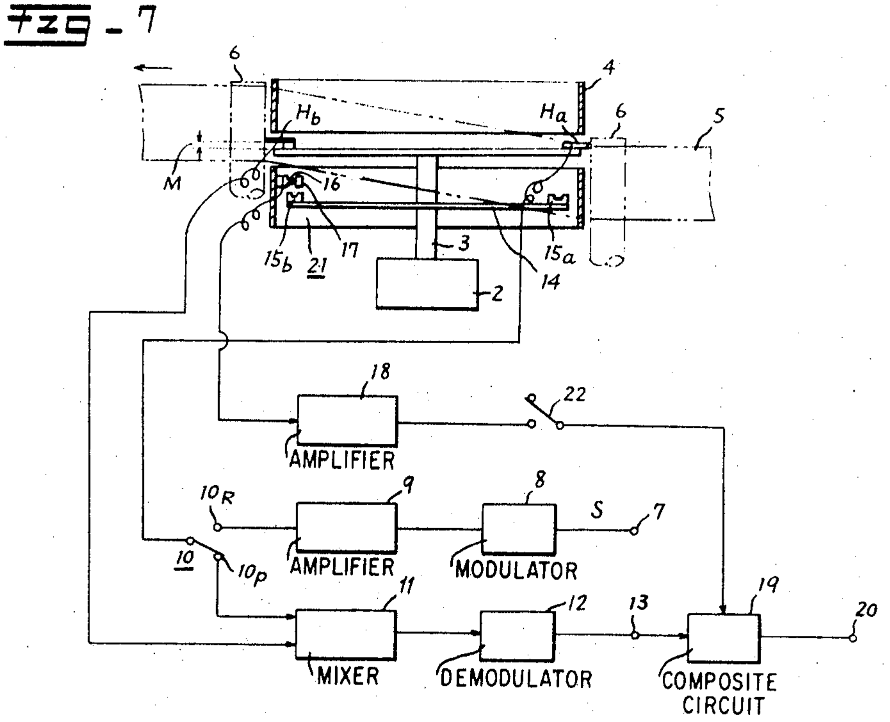
FIGURE 7 is a composite system diagram schematically illustrating one embodiment of a recording and reproducing system in accordance with the present invention.

In order to avoid this and in accordance with the present invention, pulse generating means 21 are positioned at spaced positions about the rotary shaft 3 in order to obtain additional vertical synchronizing pulses. These additional vertical synchronizing pulses are inserted into the train of video signals emanating from the output terminal 13 in order to obtain video signals which include stabilized vertical synchronizing pulses. In FIGURE 7 there is illustrated a composite system diagram for inserting these additional vertical synchronizing pulses into the video signals. The components in FIGURE 7 that are similar to those components illustrated in FIGURES 3, 4 and 6, are identified by the same reference numerals and since these components function in the same manner as in the previous figures no detailed explanation will be given of their operation.

As illustrated in FIGURE 7, a rotary disc 14 is mounted on the rotary shaft 3 and rotates in a plane parallel to the heads $H_a$ and $H_b$. The periphery of the rotary disc 14 has attached thereto magnets **15*a* and 15*b* which for purposes of this illustration are shown spaced apart a rotary angular distance of $360°/n$, or 180 degrees. A stationary pickup head 17 which has associated therewith a pickup coil 16 is attached to the guide member 4. The pickup head 17 produces a pulse in cooperation with the magnets 15*a* and 15*b* whenever the magnet heads $H_a$ and $H_b$ reproduce the vertical synchronizing signals recorded on the magnetic tape 5. The pulses produced by the head 17 are applied to a pulse forming amplifier 18 in order to obtain additional vertical synchronizing pulses and these additional vertical synchronizing pulses are then applied to a composite circuit 19 which is also adapted to receive the signal emanating from the output terminal 13. As a result video signals having additional vertical synchronizing pulses are obtained at the terminal 20**.

It will accordingly be seen that through the utilization of the system illustrated in FIGURE 7 video signals can be reproduced which have stabilized vertical synchronizing signals. In addition, through utilization of the system of the present invention motion can be stopped in order to produce still picture signals through the use of the reproducing signal previously described.

Figure 8:
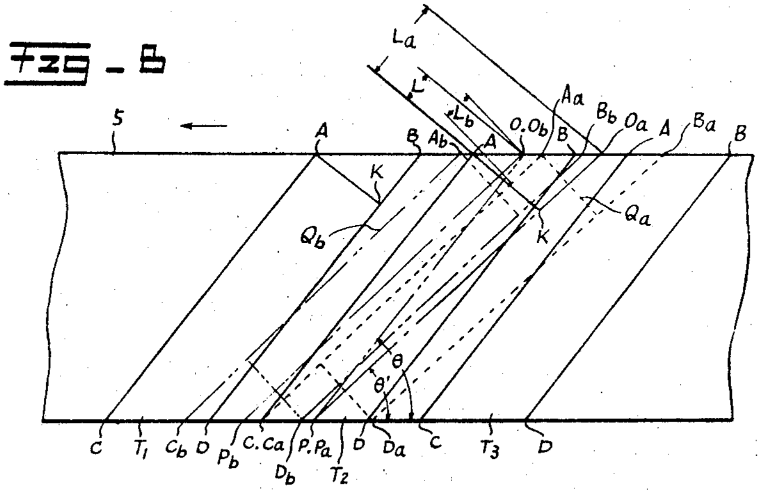
FIGURES 8 through 10 schematically illustrate on an enlarged scale the magnetic tracks formed on magnetic tape in accordance with the present invention.
Figure 9:
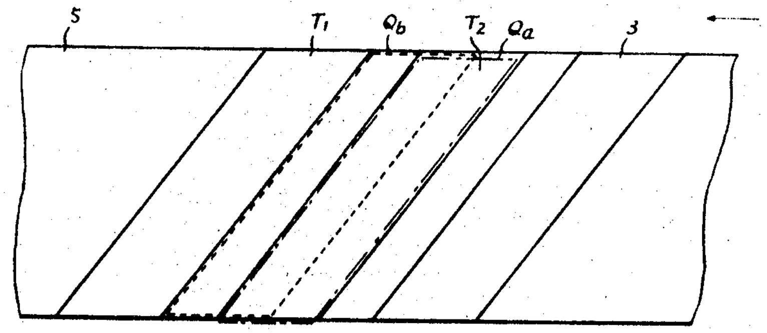
Figure 10:
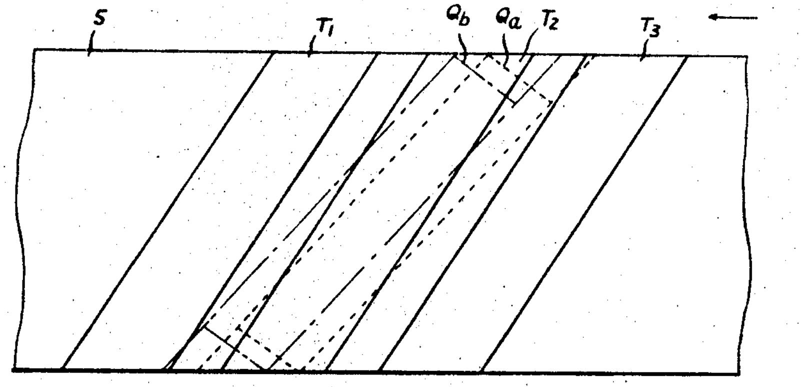

In describing the apparatus of the present invention reference was made to FIGURE 5 which illustrates schematically the magnetic tracks formed on a magnetic tape 5. These magnetic tracks are reproduced in FIGURES 8, 9 and 10 and reference will be had to these figures to explain the system of the present invention. In FIGURES 8, 9 and 10 there are illustrated by solid lines the magnetic tracks $T_1$, $T_2$, $T_3$, etc., which are shown on an enlarged scale for purposes of illustration. The magnetic tracks extend obliquely across the width of the magnetic tape 5, each track extending from the segment AB of the upper edge of tape 5 to the segment CD forming the lower edge of the tape 5. The magnetic tracks form an angle $\theta$ with respect to the lengthwise direction of the tape 5. As illustrated in FIGURE 8 a line is drawn from the point A on line AC which is perpendicular to the line BD and intersects the line BD at the point K. A vertical synchronizing signal is recorded on this segment BK. With the aid of FIGURES 8, 9 and 10 the operation of the system of the present invention will be described in connection with the reproduction of still picture signals from the magnetic tracks on the magnetic tape 5 by means of the magnetic head $H_a$ $H_b$ when the magnetic tape 5 is in a stationary position.

As illustrated in FIGURE 8 the central or middle point $O_b$ of the trace track $Q_b$ formed by the magnetic head $H_b$ on the upper edge of the magnetic tape 5 coincides exactly with the mid point O of the magnetic track $T_2$, and the trace track $Q_b$ extends obliquely at an angle $\theta'$ with respect to a lower edge CD of the tape 5. The angle $\theta'$ as illustrated is smaller than the angle $\theta$ and the trace track $Q_b$ extends obliquely at this angle $\theta'$ from the segment $A_b$ $B_b$ on the upper edge of the magnetic tape 5 to the segment $C_b$ $D_b$ on the lower edge of the magnetic tape 5. The middle point of the trace track $Q_b$ coincides exactly with the mid point $P_b$ on the lower edge of the magnetic tape 5 between the magnetic track $T_1$ and $T_2$. In a similar manner the trace track $Q_a$ of the magnetic head $H_a$ extends obliquely at an angle $\theta'$ from the segment $A_a$ $B_a$ on the upper edge of the magnetic tape 5, the mid point of the track $Q_a$ coinciding with the mid point $O_a$ on the upper edge of the magnetic tape 5 between the magnetic tracks $T_2$ and $T_3$, down to the segment $C_a$ $D_a$ on the lower edge of the tape 5, the mid point $P_a$ of this segment coinciding with the mid point P of the magnetic track $T_2$. In this manner the magnetic track $T_2$ can be reproduced by the magnetic heads $H_a$ and $H_b$. In FIGURES 8, 9 and 10 the magnetic tracks and the non-magnetized portions are illustrated at a rate of two to one in width. Accordingly, the terminating point of the trace track $Q_b$ of the magnetic head $H_b$ overlaps that of the magnetic track $T_1$, while the starting point of the trace track $Q_a$ of the magnetic head $H_a$ overlaps that of the magnetic track $T_3$. Since the two magnetic heads $H_a$ and $H_b$ scan the magnetic track $T_2$, however, which is virtually a signal line, a so-called still picture signal can be reproduced.

The vertical synchronizing signal, however, on the magnetic track $T_2$, is recorded at a position spaced a distance L from the mid point of the track $T_2$ on the upper edge of the magnetic tape 5. In the case of the trace track $Q_a$ accordingly the vertical synchronizing signal is reproduced by the head $H_a$ at a time which corresponds to the distance $L_a$, while in the case of the trace track $Q_b$ the vertical synchronizing signal is reproduced by the head $H_a$ at a time which corresponds to a distance $L_b$. As illustrated in FIGURE 8 the distance $L_b$ is different from the distance $L_a$. As a result of this difference the vertical synchronizing signals are reproduced at different times. Accordingly when a still picture signal is obtained and an additional vertical synchronizing signal from the pulse generating means 21 is incorporated in the video signal as described with reference to FIGURE 7, the reproduced picture is unstable in the vertical direction. This is due to the fact that the additional vertical synchronizing pulse differs considerably from the above reproduced vertical synchronizing signal at every field. Due to this fact the picture is likely to move up and down and as is apparent from the foregoing this is due to the fact that the angular distance $\phi$ between the magnetic heads $H_a$ and $H_b$ is 180 degrees plus or minus K°.

In accordance with the present invention the foregoing disadvantages are overcome by stopping the magnetic tape 5 during reproduction and rotating the magnetic heads $H_a$ and $H_b$ at the same speed as during recording in order to produce a still picture signal. The vertical synchronizing signal in the reproduced video signal emanating from the demodulator 12 is fed to the output terminal 20 so that it can be utilized but without applying the ouput from the pulse generating means 21 to the mixer circuit 19, i.e. the switch 22 is opened. Therefore during normal reproduction extremely stabilized still picture signals can be produced without causing the vertical synchronizing signals to become unstable, and during reproduction of still picture signals the signals are reproduced by opening the connection from the pulse generating means 21 to the mixer circuit 19. As illustrated in FIGURE 7 a switch 22 is provided for cutting off the additional vertical synchronizing pulses from the pulse generating means 21 to the mixer circuit 19 during reproduction of still picture signals.

When the axial distance M between the magnetic head $H_a$ and $H_b$ is $W/2$ as illustrated in FIGURE 7, the magnetic head $H_a$ and $H_b$ scan exactly the same magnetic tracks during normal reproduction. During reproduction of still picture signals, however, either one or both of the magnetic heads simultaneously scan adjacent magnetic tracks, such, for example, as $T_1$ and $T_2$. Accordingly, there is the possibility that beat noise can be produced in the reproduced signal which would deteriorate picture quality.

In order to avoid this and in accordance with the present invention, the axial distance M between the magnetic heads $H_a$ and $H_b$ is selected to be a distance M' which is shorter than the distance $W/2$. With this arrangement when the magnetic head $H_a$ scans the magnetic track $T_2$ as illustrated in FIGURE 9, during normal reproduction, the trace track $Q_b$ of the magnetic head $H_b$ shifts to the magnetic track $T_1$ which is parallel thereto. It is possible, however, to obtain a picture which has no beat noise by selecting the distance M' in such a manner that the magnetic head $H_b$ will not scan the magnetic track $T_2$ and $T_1$ simultaneously. In addition during still picture reproduction the trace tracks $Q_a$ and $Q_b$ of the magnetic heads $H_a$ and $H_b$ do not overlap the magnetic tracks $T_1$ and $T_3$ as illustrated in FIGURE 10 so that no beat noise is produced and a stable picture is reproduced.

It is apparent from the foregoing that through the utilization of the system of the present invention picture signals can be obtained with a system in which the amount of magnetic tape used is reduced by one half, and in which the vertical synchronizing signals are prevented from becoming unstable which results in obtaining a still picture which has no beat noise. It is to be understood that while the present invention has been described with reference to a system in which video signals of every other field are magnetically recorded and/or reproduced, that the invention is applicable as well to other systems in which video signals of every desired field or frame are sampled. In such a case, the variable F in the aforementioned equation $Q=F/n$ is considered to be the frequency of the field or frame which is to be sampled.

It is to be understood that although one embodiment of the invention has been described that various modifications and variations may be made thereto without departing from the novel concepts of this invention, which are set forth in the appended claims.

What it is desired to secure by Letters Patent is:

1. Apparatus for recording and reproducing visual image signals having vertical synchronizing pulses, said apparatus comprising a plurality of heads, means for rotating said heads, a recording medium, guide means for guiding said recording medium past said heads whereby visual image signals are recorded on said recording means in skew tracks, circuit means for actuating less than said plurality of heads during recording of said visual image signals whereby less than all of said visual image signals are recorded, means for scanning all of said recorded signals on said recording medium with all of said plurality of heads during reproduction to reproduce each of said recorded signals a plurality of times with the reproduced signals being identical in duration to said visual image signals prior to recording and overlapping to generate beats which disturb the synchronization of said vertical synchronizing pulses in the recorded signal, electrical means for generating additional vertical synchronizing pulses and circuit means for combining said additional vertical synchronizing pulses with said reproduced signals during reproduction to provide stabilized vertical synchronization.

2. Apparatus in accordance with claim 1 wherein said additional vertical synchronizing pulses are generated during rotation of said heads.

3. Apparatus in accordance with claim 1, wherein switch means are provided for isolating said electrical means for generating additional vertical synchronizing pulses from said circuit means during reproduction of still picture signals.

4. Apparatus in accordance with claim 1 wherein said tracks in which the signals are recorded are spaced apart, said heads are offset from each other in the direction of their axis of rotation so that, during normal reproduction with said medium being moved past said heads, all of said heads scan each of said tracks in sequence, and the distance by which said heads are offset is less than the spacing between said tracks divided by the number of said heads so that, during reproduction of said still picture signals, said heads all respectively scan a single selected track.

5. Apparatus for recording and reproducing visual image signals having vertical synchronizing pulses whereby only predetermined portions of said signals are recorded and each of said recorded signals is reproduced a plurality of times during reproduction such that said reproduced signals are equal in duration to said original signals prior to recording, said apparatus comprising a plurality of magnetic heads, means for rotating said heads, magnetic tape, guide means for guiding said tape past said heads whereby visual image signals are recorded on said tape in the form of skew tracks, circuit means for activating less than said plurality of heads during recording of said visual images whereby less than all of said visual image signals are recorded, means for scanning each of said tracks on said tape with all of said plurality of heads during reproduction to reproduce each of said recorded signals a plurality of times with the reproduced signals being identical in duration to said visual image signals prior to recording and overlapping to generate beats which disturb the synchronization of said vertical synchronizing pulses in the recorded signals, electrical means for generating additional vertical synchronizing pulses and circuit means for combining said additional synchronizing pulses with said reproduced signals during reproduction to provide stabilized vertical synchronization.

6. Apparatus in accordance with claim 5 wherein magnet means are rotatively mounted to rotate in unison with said heads and to electrically engage pickup heads whereby said pickup heads produce a vertical synchronizing pulse.

References Cited

UNITED STATES PATENTS 3,322,892 5/1967 Yasuoka.

3,391,248 7/1968 Hirota.

ROBERT L. GRIFFIN, Primary Examiner

HOWARD W. BRITTON, Assistant Examiner

U.S. Cl. X.R.

178—69.5; 179—100.2